United States Patent [19]

Walker et al.

[11] Patent Number: 5,253,531
[45] Date of Patent: Oct. 19, 1993

[54] SYSTEM AND METHOD FOR MONITORING TORSIONAL VIBRATIONS AND OPERATING PARAMETERS OF ROTATING SHAFTS

[76] Inventors: Dana A. Walker, 622 Oakland Hills Dr., #302, Arnold, Md. 21012; Michael D. Walker, 148 Fourth St., St. James, N.Y. 11780

[21] Appl. No.: 866,055

[22] Filed: Apr. 10, 1992

[51] Int. Cl.$^5$ .............................................. G01H 9/00
[52] U.S. Cl. ................................ 73/650; 73/862.324; 250/237 G; 356/374
[58] Field of Search .......... 250/237 G, 231.13, 231.14; 356/374; 73/862.324, 862.321, 650, 655

[56] References Cited

U.S. PATENT DOCUMENTS

| | | |
|---|---|---|
| 3,495,452 | 2/1970 | Johnson, Jr. et al. |
| 3,564,909 | 2/1971 | Foskett et al. |
| 3,885,420 | 5/1975 | Wolfinger |
| 3,934,459 | 1/1976 | Wolfinger et al. |
| 4,121,272 | 10/1978 | Wolfinger |
| 4,148,222 | 4/1979 | Wolfinger |
| 4,235,958 | 11/1980 | Barraud et al. |
| 4,317,371 | 3/1982 | Wolfinger |
| 4,430,566 | 2/1984 | Searle |
| 4,433,585 | 2/1984 | Levine |
| 4,551,017 | 11/1985 | Mannava et al. |
| 4,621,256 | 11/1986 | Rusk |
| 4,641,027 | 2/1987 | Renner et al. ........... 250/237 G |
| 4,727,014 | 2/1988 | Horn et al. |
| 4,806,454 | 2/1989 | Yoshida et al. |
| 4,818,661 | 4/1989 | Taylor et al. |
| 4,885,231 | 12/1989 | Chan |
| 4,975,569 | 12/1990 | Ebina et al. |
| 4,978,954 | 12/1990 | Koike |
| 4,995,257 | 2/1991 | Leon |
| 4,997,747 | 3/1991 | Yoshida et al. |
| 5,001,937 | 3/1991 | Beehtel et al. ........... 73/862.324 |

FOREIGN PATENT DOCUMENTS 2093991  9/1982  United Kingdom ........... 73/862.324

OTHER PUBLICATIONS

"Non-contact sensor measures engine torque" based on SAE paper 820206, Noncontact Miniature Torque Sensor for Automotive Application by William J. Fleming. ISA Transactions: 12 (186–190) 1973–"Optical Measurements of Very Small Strains During Torsional Oscillations of Metallic Rods" by Hartman & Palmer.

(List continued on next page.)

Primary Examiner—Hezron E. Williams
Assistant Examiner—Rose M. Finley
Attorney, Agent, or Firm—Sixbey, Friedman, Leedom & Ferguson

[57] ABSTRACT

An optical system for monitor vibration, particularly applicable to power shafts in rotating power systems such as those found in trucks, naval vessels, turbogenerators, hydroelectric and nuclear generators, and helicopters, has an optical unit including IRLED radiation sources aimed at grid lines applied around the circumference of the shaft. The reflection of the radiation is imaged through lenses and a matching Ronchi grid onto a photodiode which produces a periodic wave signal from which indications of rotational irregularities can be derived. In one embodiment, duplicate radiation sources and imaging apparatus are arranged in diametric opposition across the shaft to permit compensation for pitch and plunge shaft vibration. In another preferred embodiment, a second, duplicate optical unit is located at a distance along the shaft from the first unit. The output signals of the two units are passed through a comparator and a EX-NOR gate, then low-pass filtered to produce a signal indicative of torsional deflection. Quadrature techniques can be used to provide shaft directional information. Also disclosed are a method and apparatus for precisely applying finely spaced grid lines to an existing shaft on site. A photosensitive material is applied to the shaft, and a strobe light synchronized to the rotation of the shaft exposes the photosensitive material as the shaft is rotated to create finely spaced grid lines on the material.

37 Claims, 12 Drawing Sheets

OTHER PUBLICATIONS

Proc Instn Mech Engrs, vol. 203–"Using an encoder as a torsional vibration transducer" by J. D. Smith and J. S. Echeverria-Villagomez (1989).

R. E. Smith & Co., Inc. Typical Client Applications–"Solving Gear Noise Problems with Single Flank Inspection" Feb., 1988 (Power Transmission Design).

Bruel & Kjaer Product Data–Torsional Vibration Meter–Type 2523.

C311/84 "A review of rolling element bearing health monitoring (III): preliminary test results on eddy current proximity transducer technique" PY Kim, Meng, MASC.

The American Society of Mechanical Engineers (84-DET-55) "Measurement of Torsional Vibration in Rotating Machinery" by J. M. Vance and R. S. French.

"Measuring Torsional Vibration" by W. H. Verhoef-Tektronix, Inc. Nov., 1977-pp. 61-66.

Technisches Messen 51 Jahrgang 1984 Heft 10-"Drehzahlmessung mit Hilfe einer optimalen PLL-Schaltung-"-Measuring of revolutions by an optimal PLL circuit.

Automotive Engineer-Apr./May 1989 "Laser tools or diesel engine development" by Halliwell, Pullen, Baker-Inst. of Sound & Vibration Research.

"Diesel Engine Vibration: Diagnosis with a Laser"-inter-noise 83-Halliwell Pullen and Baker-Inst. of Sound and Vibration Research, pp. 1139-1142.

"Torsional Vibration Behavior of Hydrodynamic Couplings" by Dr. Ing. D. Sideris and Dipl. Ing. H. Worsch, pp. 46, 48.

Applied Optics, vol. 11, No. 4, Apr. 1972-"Transmission of Incoherent Light Between Ronchi Grids" by C. Harvey Palmer & Bruce Z. Hollmann.

Applied Optics, vol. 8, No. 5, May 1969-"Differential Optical Strain Gauge for Torsion Measurements" by C. Harvey Palmer.

VIBRAC Corp. Model 1038 Manual-Motorized Dynometer.

VIBRAC Corp. 8800 Series Manual-Motor Evaluators.

RONCHI GRID MASK
WITH QUADRATURE

PITCH MOTION (AMPLITUDE EXAGGERATED)

PLUNGE MOTION (AMPLITUDE EXAGGERATED)

SYSTEM AND METHOD FOR MONITORING TORSIONAL VIBRATIONS AND OPERATING PARAMETERS OF ROTATING SHAFTS

BACKGROUND ART

Torsional vibrations in power transmission shafts are produced by load fluctuations or by fluctuations of the power source or transmission system. Detection of these vibrations, especially if they can be isolated from other vibrations and noise, is a means of early detection of flaws in the transmission system. The smaller the fluctuation which can be detected, and the more specific the location of the source, the earlier such flaws can be identified so that potentially serious problems can be averted.

Indirect means of monitoring, such as microphones or accelerometers - mounted for example to a bearing block - can provide a warning when failure is imminent, but the information of interest in their signals is partially masked by ordinary vibrations and cannot identify the specific source of vibrations. Previous optical means of detecting torsional vibrations are either not sensitive enough to detect small fluctuations, or are expensive, fragile laboratory devices not suitable for continuous monitoring in the hostile environment of a power system. Additionally, many of these systems must be installed before assembly of the power system and/or require access to the ends of shafts in the system.

It has been found that detailed analysis of torsional variations, for example those that recur at the same point during a rotational cycle of a shaft or system of shafts can be used to identify wear or damage to gears and other transmission components used to transmit power to and receive power from the shaft. For example, a gear with a worn tooth will result in uneven application of power to the shaft due to delay in engagement of the worn tooth with its mating tooth. Prior art systems do not permit the desired regular monitoring and detection of very small recurrent variations in power transfer, and may lack the sensitivity to identify developing problems before they have already become audible or visible to an experienced mechanic. It would therefore be desirable to provide a system and method capable of resolving and reporting very small torsional vibrations which could be permanently installed on an oceangoing vessel or in an industrial facility.

Hartman and Palmer, in ISA Transactions, Volume 12, pp 186-190 (1973), disclose application of an optical technique to measurement of torsional oscillations on a nonrotating beam in a laboratory and were able to measure a resolution of $10^{-4}$ arc-seconds. In the field, however, the inventors have found that resolution is limited by motion of optics components relative to each other, and with a moving shaft resolution will also be affected by shaft run-out and other shaft vibrational modes. Resolution of much less than one arc-second under these dynamic conditions appears difficult to reach by any optical technique due to vibration of the optics.

U.S. Pat. No. 4,551,017 to Mannava et al. shows a system which is said to optically measure torsional vibration of a shaft using a photodetector which senses the passage of a grating on the moving surface of the shaft. An optional reference beam at the same location is used to detect other motion of the shaft. The photodetector output is passed through a zero-crossing detector. The system disclosed uses a laser Doppler velocimetry system for illuminating the grating. Because this system senses rotation of the shaft at only one point, it actually measures changes in rotational speed, rather than torsional vibration. Although torsional vibration or oscillation is often associated with variations in rotational speed, there are other possible causes of changes in rotational speed. Inherently, no one or two point system can resolve vibrations lower than 8-10 arc-seconds in the presence of even 0.001" of non-torsional vibration. Thus, measurement at one or two points of rotational speed alone does not permit complete analysis of system operation.

Also, laser-based systems such as that disclosed by Mannava are designed for laboratory or temporary field testing use by a skilled technician, and not for permanent installation in industrial or naval applications. Systems using lasers are expensive and their accuracy and reliability are degraded by misalignment, vibration, and physical shock which inherently occur in constant field use. For these reasons, no gas laser system can be considered for fleet deployment. Even solid-state lasers require expensive servo-power supplies and have relatively short lifetimes, making them less desirable for permanent installations.

U.S. Pat. No. 4,995,257 to Leon shows an angular shaft vibration monitor with two optical sensors spaced along the length of the shaft. Beams of light are shined toward the shaft, and are reflected by markings on the shaft, with the scattering of light detected by optical sensors. The difference between the sensor signals is used to measure torsional vibration. However, the markings used are single marks. While such systems may be effective in detecting large random torsional vibrations, they are incapable of finely resolving higher frequency torsional variations occurring only at certain points over an entire revolution of a shaft.

U.S. Pat. No. 4,433,585 to Levine shows a method and apparatus for measuring torsional deviation of a shaft using optical diffraction transmission gratings. Signals from two photodiodes are passed through comparators and their phases compared. The resulting signal is low-pass filtered to generate a signal representing torsional deviation. In this system, the diffraction gratings are arranged at opposite ends of the shaft, making it difficult or impossible to retrofit an existing industrial or naval shaft for such detection. Such a system cannot be applied on multiple shafts or on shafts with inaccessible ends. On very large shafts, the size of the optical disc required becomes an obstacle to easy installation, and the large optical discs will introduce error into measurements because of their own vibrations. Finally, Levine does not disclose a system which detects variations in torsional deviation, i.e. torsional vibration. It is desirable to monitor not simply the steady state twist of the shaft, but oscillations in the shaft twist, principally the first few torsional pendulum modes. In the largest shafts, the twist due to the steady state load is already small, perhaps 50 arc-seconds/foot. Oscillation amplitudes will generally be a small fraction of this amount, say 5 arc-seconds/foot. Even this represents a very high energy oscillation for which monitoring would be desirable.

U.S. Pat. No. 3,885,420 to Wolfinger shows a method and apparatus for measuring torsional vibration of a shaft. A signal from a shaft rotation sensor is passed through a zero crossing detector and its phase is compared with a second signal. The resulting signal is low-pass filtered to generate a signal representing torsional vibration. However, the sensors used are proximity sensors used with gear teeth. These can only resolve low frequency, large amplitude variations. Furthermore, the signals are processed by a phase-locked-loop and low pass filtered, limiting the application to less than one octave of shaft speed range and to low frequency variations. The system disclosed is applied to a constant speed 60 hz power generator for which it is suited, but like the Mannava et al. system described above, systems of this type do not provide true torsional vibration readings and are incapable of resolving either small amplitude or high frequency vibrations.

U.S. Pat. No. 4,317,371 to Wolfinger shows the same non-optical torsional vibration monitor to which quadrature has been added along which separate frequency bandpass filters to help discriminate against periodic electrical interference which masks the signal. Another patent to Wolfinger et al., U.S. Pat. No. 3,934,459, shows another system using multiple non-optical sensors in a complex machine to detect variations in torsional oscillation between plural rotating shafts.

U.S. Pat. Nos. 4,806,454 to Barraud et al. and 4,997,747 to Yoshida et al. show generally the production of diffraction gratings using photo processes. However, these patents are directed primarily to etching techniques and do not show or suggest application of grating lines to a cylindrical shaft. A very large number of lines is required to cover the perimeter of any shaft greater than about 2.5" in diameter. Because of the number of lines and the need for precise spacing, diffraction errors and lens aberrations inherent in conventional techniques (such as photoreduction of a larger pattern onto a shaft) make it impossible to apply these techniques to forming very fine lines about the circumference of a shaft.

Photoelectric torque transducers, such as those used in the 8800 series Motor evaluators and 1038 Motorized Dynamometer made by Vibrac Corporation, are also known, but are not suitable for torsion vibration measurement because frequency response is limited by line spacing and by the digital counter processing method used. Such systems do not have the precision to resolve under 300 arc-seconds. These transducers were designed to include a shaft and torsion rod which must transmit the shaft loads, and have maximum loads of 200 lb-ft.

Similarly, laser doppler velocimetry systems developed by Brüel & Kjaer, Dantec, and TSI, Inc. are laboratory research instruments unsuitable for fleet deployment due to their expensive construction, fragile nature, and difficulty of use.

In conclusion, none of the prior art systems known to the inventors provides an entirely satisfactory apparatus and method which can be permanently retrofitted to existing industrial and shipboard applications to continuously detect and analyze torsional vibrations occurring in rotating shafts.

SUMMARY OF THE INVENTION

Therefore, it is a general object of the present invention to provide a system for monitoring torsional vibrations and oscillations in power transmission shafts.

A further general object of the present invention is to provide an apparatus and method for precision application of finely spaced lines to a shaft.

A more specific object of the present invention is to provide a system for measuring torsional strain in a power transmission shaft which is capable of resolving instantaneous torsional strains on the order of one arc-second per foot.

It is another object of the present invention to provide a system which can be permanently installed in an industrial plant or an ocean-going vessel to monitor the operation of a shaft.

Yet another object of the present invention is to provide a system for monitoring a power transmission shaft which can be constructed at low cost and which is capable of providing information on torsional vibration, torsion, rotation rate, variations in rotation rate, vertical pitch and plunge of the shaft, shaft power, torque and torque fluctuations.

A further object of the present invention is to provide a system for monitoring torsional oscillations and other shaft operational parameters which can be retrofitted to existing shafts, particularly shafts in industrial installations and power shafts of naval vessels.

Another object of the present invention is to provide a system for monitoring shaft operation which uses a standardized, interchangeable set of hardware and software to monitor any shaft.

It is also an object of the present invention to provide a system for monitoring shaft operation which can withstand large vibrational and shock loads without damage.

Yet another object of the present invention is the provide a shaft operation monitoring system which can be readily adapted to operate in adverse environments, such as underwater.

Another object of the present invention is to provide a shaft monitoring system which does not require machining of the shaft or addition of protruding components to the shaft.

It is also an object of the present invention to provide an accurate shaft torsional strain monitoring system which can be used to diagnose repetitive variations in torsion caused by worn or damaged components in the transmission systems attached to the shaft.

Another object of the present invention is to provide a system for accurately measuring torsional strain on a shaft which compensates for non-rotational movement of the shaft to produce a valid output.

A further object of the present invention is to provide an optical shaft status monitoring system which uses infrared light emitting diodes to image finely spaced grid lines on the shaft through a Ronchi grid mask onto an optical detector for producing an output indicative of shaft movement.

Another object of the present invention is to provide a unitary optical sensing unit for sensing the movement of a shaft which is designed to permit easy adjustment and positioning of the optical unit relative to the shaft.

Yet another object of the present invention is to provide an optical shaft monitoring system including an optical sensing unit with a rotating turret which can be adjusted to position a photodetector for detecting the interaction of a Ronchi grid mask and an image of shaft gird lines, which can also be adjusted to position a light source to image the Ronchi grid mask onto the shaft grid lines to facilitate positional adjustment and focusing of the optical sensor unit.

A further object of the present invention is to provide a method for retrofitting a shaft with finely spaced grid lines using a photographic process.

A further object of the present invention is to provide a method for applying finely spaced grid lines to a shaft such that multiple sets of matched, precisely spaced grid lines are produced at a plurality of locations and on a plurality of shafts along the axis of rotation of the shaft.

A more detailed object of the present invention is to provide a method for optical placement of finely spaced grid lines on a shaft, comprising the steps of preparing a film master, placing the master on a shaft, placing photosensitive material at other locations on the shaft or shafts, and sensing the pattern of the film master to control the exposure of the photosensitive material by a light source proximate thereto.

Yet another object of the present invention is to provide a method for making a film master having a plurality of closely spaced grid lines by exposing the film selectively using a light source driven by a precision timing circuit.

Further objects and advantages of the present invention will be apparent to those skilled in the art upon review of the specification and drawings.

Such objects are achieved in the present invention by an optical system for monitoring torsional vibration which has an optical unit including IRLED radiation sources aimed at grid lines applied around the circumference of the shaft. The scattering of the radiation is imaged through lenses and a matching Ronchi grid onto a photodiode which produces a periodic wave signal from which indications of rotational irregularities can be derived. In one embodiment, duplicate radiation sources and imaging apparatus are arranged in diametric opposition across the shaft to permit compensation for pitch and plunge shaft vibration. In another preferred embodiment, a second, duplicate optical unit is located at a distance along the shaft from the first unit. The output signals of the two units are passed through a comparator and an EX-NOR gate, then low-pass filtered to produce a signal indicative of torsional deflection. Quadrature techniques can be used to provide shaft directional information.

The system produces readings of torsional vibration and torsion, rotation rate, variations in rotation rate, and vertical pitch and plunge of the shaft. In addition, shaft power, torque, and torque fluctuation readings can be derived from the output of the sensors disclosed.

To facilitate the provision of matched pairs of grid lines at spaced locations on the shaft, a method and apparatus for precisely applying finely spaced grid lines to an existing shaft on site is disclosed. A photosensitive material is applied to the shaft, and a strobe light synchronized to the rotation of the shaft exposes the photosensitive material as the shaft is rotated to create finely spaced grid lines on the material. The method disclosed triggers the strobe light to form the lines based on output signals from the disclosed sensors which are aimed at a photographic film master attached about the circumference of the shaft.

BRIEF DESCRIPTION OF THE DRAWINGS

FIG. 3 is a schematic diagram of the electronic operating circuitry of the sensor unit of FIG. 2a;

FIG. 6b is an assembly drawing showing the construction of the light aperture used in the apparatus of FIG. 6a;

FIG. 7 is a detailed schematic diagram of the power supply shown in the apparatus of FIG. 6a;

FIG. 8 is a detailed schematic diagram showing the strobe control circuit of the apparatus of FIG. 6a;

DETAILED DESCRIPTION OF THE PREFERRED EMBODIMENTS

Figure 1:
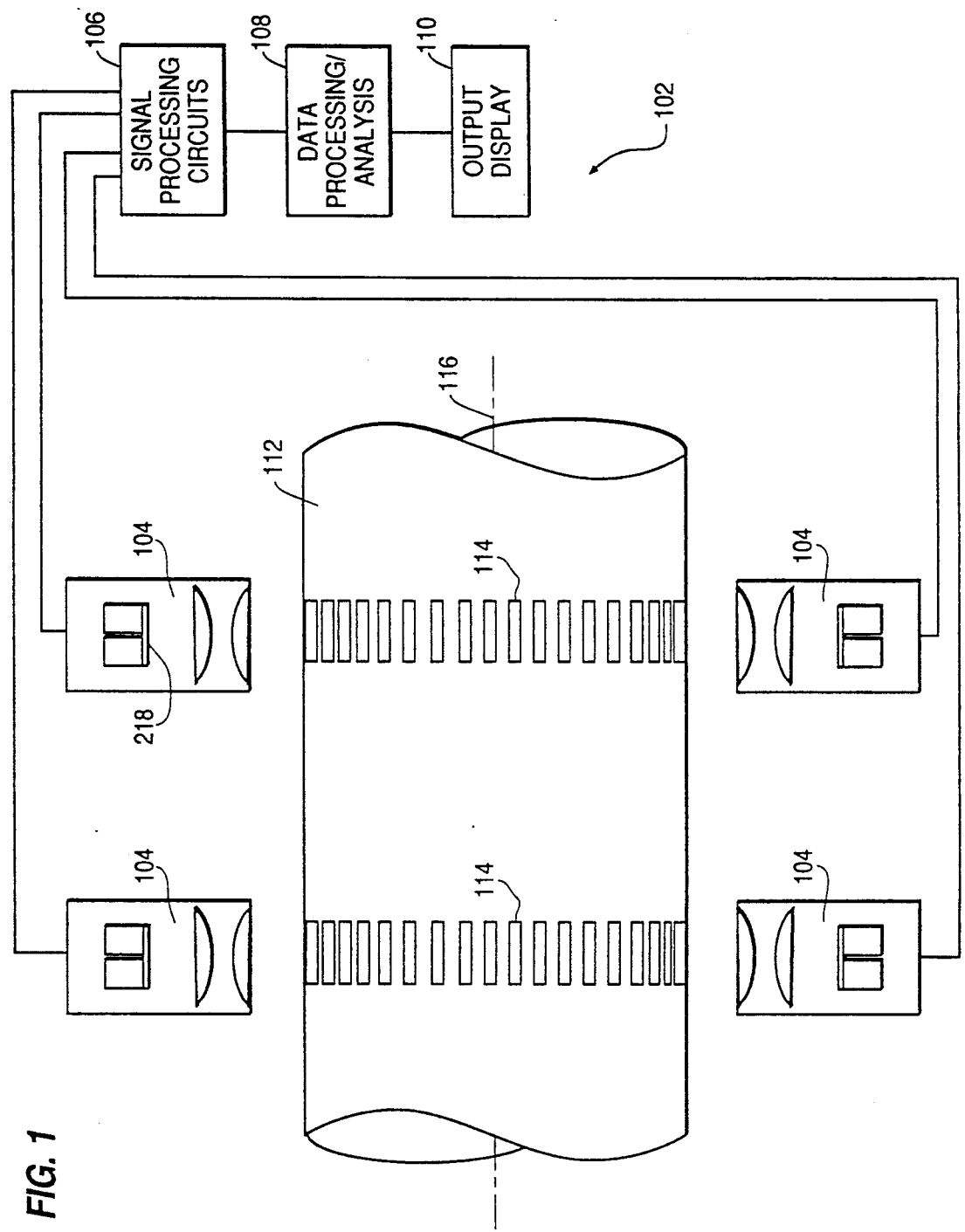
FIGS. 1 is a block diagram showing the components of the system of the present invention installed for monitoring of a shaft.

The present invention comprises a system including incoherent IRLED sources and a linear phase detector to resolve small angular differences between two sensors (shaft twist angles).

The system of the present invention will be described in terms of a preferred embodiment shown generally in FIG. 1. The shaft sensing and monitoring system of the present invention is shown generally at 102. Shaft sensing and monitoring system 102 comprises one or more sensor units 104, which are operably connected to signal processing circuits 106. Signal processing circuits 106 are connected to data processing and analysis circuits 108 which has a connected output display 110. Sensor units 104 are mounted proximately to a shaft 112, the operation of which is to be monitored by system 102. Shaft 112 is provided with one or more sets of finely spaced lines 114 which are located about the circumference of shaft 112, parallel to each other and to a central longitudinal axis 116 of shaft 112. Preferably, there are 5 to 10 lines 114 per mm on the surface of shaft 112.

Figure 11A:
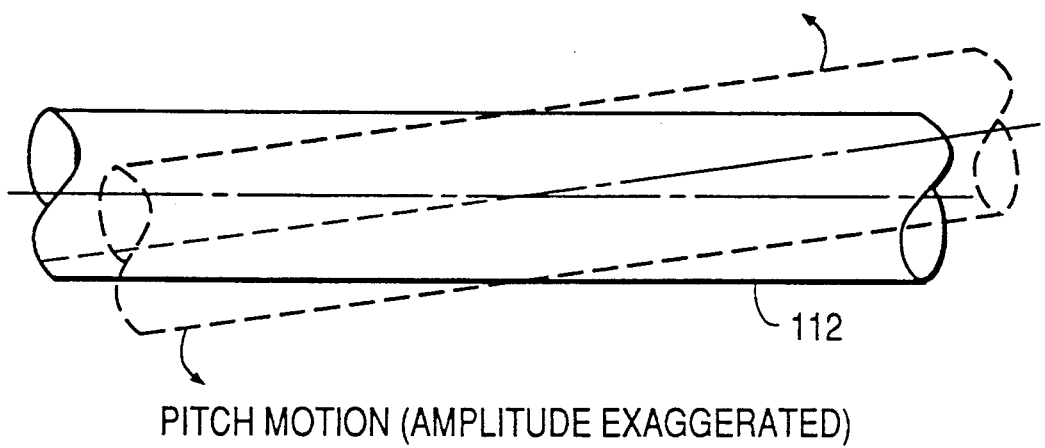
FIGS. 11a and 11b are diagrams showing pitch and plunge motion of a shaft, respectively.
Figure 11B:
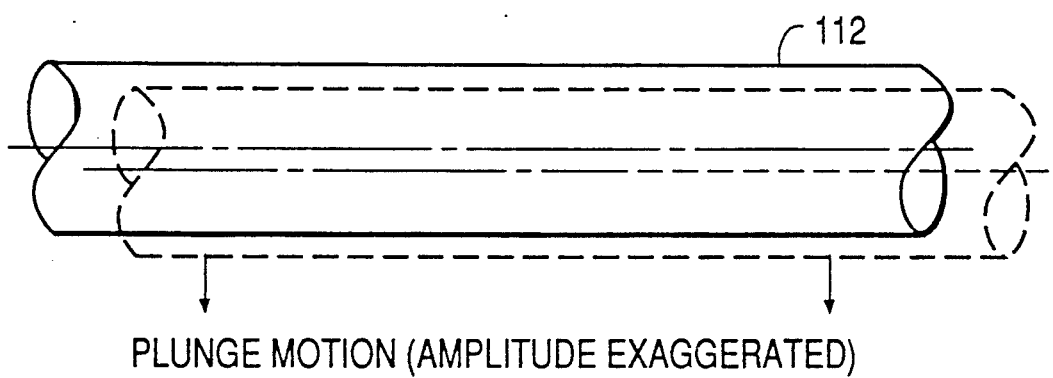

In the preferred embodiment shown in FIG. 1, two identical sets of lines 114 are provided on shaft 112, separated by a distance along central longitudinal axis 116, which is the axis of rotation of the shaft 112. The distance along the length of shaft 112 between sets of lines 114 may be, for example, on the order of 1 meter or two shaft diameters, whichever is greater. In the preferred embodiment shown in FIG. 1, a pair of diametrically opposed sensor units 104 is provided proximate to each set of lines 114, and sensor units 104 operate to sense the passage of lines 114 passed sensor units 104 as shaft 112 rotates about axis 116. The present invention attains better resolution by using this four point system to compensate for non-torsional vibrations. The use of four sets of photodiodes permits compensation for pitch and plunge of the shaft (as illustrated in FIGS. 11a and 11b) at the measurement location. Although pitch and plunge is not significant with less accurate prior art systems designed for use with small shafts, on a shaft four feet in diameter a vertical vibration of only 0.001" produces an apparent angular rotation of more than 8 arc-seconds. With sets of detectors on both sides of the shaft, vertical displacement (plunge, as shown in FIG. 11b) or tilt (pitch, as shown in FIG. 11a) can be compensated. These also can be used to produce precise (<<0.001") time-resolved measurements of both pitch and plunge of the shaft (due e.g. to bending modes, shaft runout, or worn bearings).

Referring again to FIG. 1, preferably, the sensor units 104 will be permanently installed in the engine room of an oceangoing vessel or in an industrial setting such as a power plant. However, it is an important advantage of the present invention that the sensor units 104 can be constructed to be air or water-tight and will operate effectively in hostile environments, such as underwater. For underwater systems, the lines 114 may be added to the shaft via a lined tape attached to the shaft with an adhesive (hydrobond) which can be applied even underwater. Alternatively, a small, secondary (idler) roller could be used in contact with the shaft. The shaft of the idler roller and sensor units 104 would be placed in a watertight housing. The shaft angle would be amplified by the diameter ratio and light transmission through murky water and fouled parts thereby avoided. However, any such mechanical coupling is expected to substantially degrade the angular resolution of the system, and therefore direct reading of lines 114 on shaft 112 is preferred if not prevented by ambient conditions.

As will be explained in more detail later, it is also possible to provide only one sensor unit 104 and one set of lines 114, or to provide two diametrically opposed sensor units 104 and a single set of lines 114, or to provide two sets of lines 114 and only one sensor unit 104 for each set of lines. These alternative configurations are less preferred because in each case the types of analysis of operation of shaft 112 that can be performed are limited in comparison to the analysis possible using the preferred embodiment shown in FIG. 1. However, as will be explained in more detail later, there are certain circumstances in which only a limited level of monitoring is required, and in these situations, one of these alternative configurations may be selected to effect a cost savings.

Signal processing circuits 106 process periodic wave signals produced by sensor units 104 to produce phase difference and line count information used to determine shaft speed, shaft twist, and instantaneous torsional strain information used by the data processing and analysis circuits 108. Signal processing circuits 106 are preferably designed in accordance with FIGS. 4a and 4b and the accompanying text. Data processing and analysis circuits 108 preferably take the form of a computer having input ports for receiving digital data from counters and digital data representations of analog levels produced by connected analog-to-digital converters. The computer of data processing and analysis circuits 108 will be provided with operating software for analyzing and reporting shaft status according to the description herein. A standard computer such as an IBM-compatible personal computer may be used, or a microprocessor system could be designed to perform the desired functions using a program in read only memory. Output ports of the computer will be connected to an output display 110 which may comprise a display screen, printer, analog gages, numeric displays, an audible alarm, or any other desired indicator. Further, the computer may be used to control the engine, power plant, etc. according to shaft status and other input data, or may be connected to transmit data indicating the status of the shaft to another computer system which performs such control functions.

Sensor units 104 each act as a means for providing a radiation energy source and detecting the scattering of the radiation energy caused by the lines 114 passing in front of sensor units 104 as the shaft 112 rotates. The scattered light at each location is detected using Ronchi grid masks and PIN photodiodes. The Ronchi grid averages out small scale irregularities in the line spacing to grain size, roughness elements, etc. It also permits collection of much more light without sacrificing resolution or frequency response. Sensor units 104 are capable of detecting the instantaneous movement of the shaft 112 to a resolution of far less than the spacing of lines 114. Specifically, a linear phase detector, described in more detail below, measures the lag which occurs between lines at one axial location relative to the other. The phase detector design permits resolution of small fractions of the line spacing.

Figure 2A:
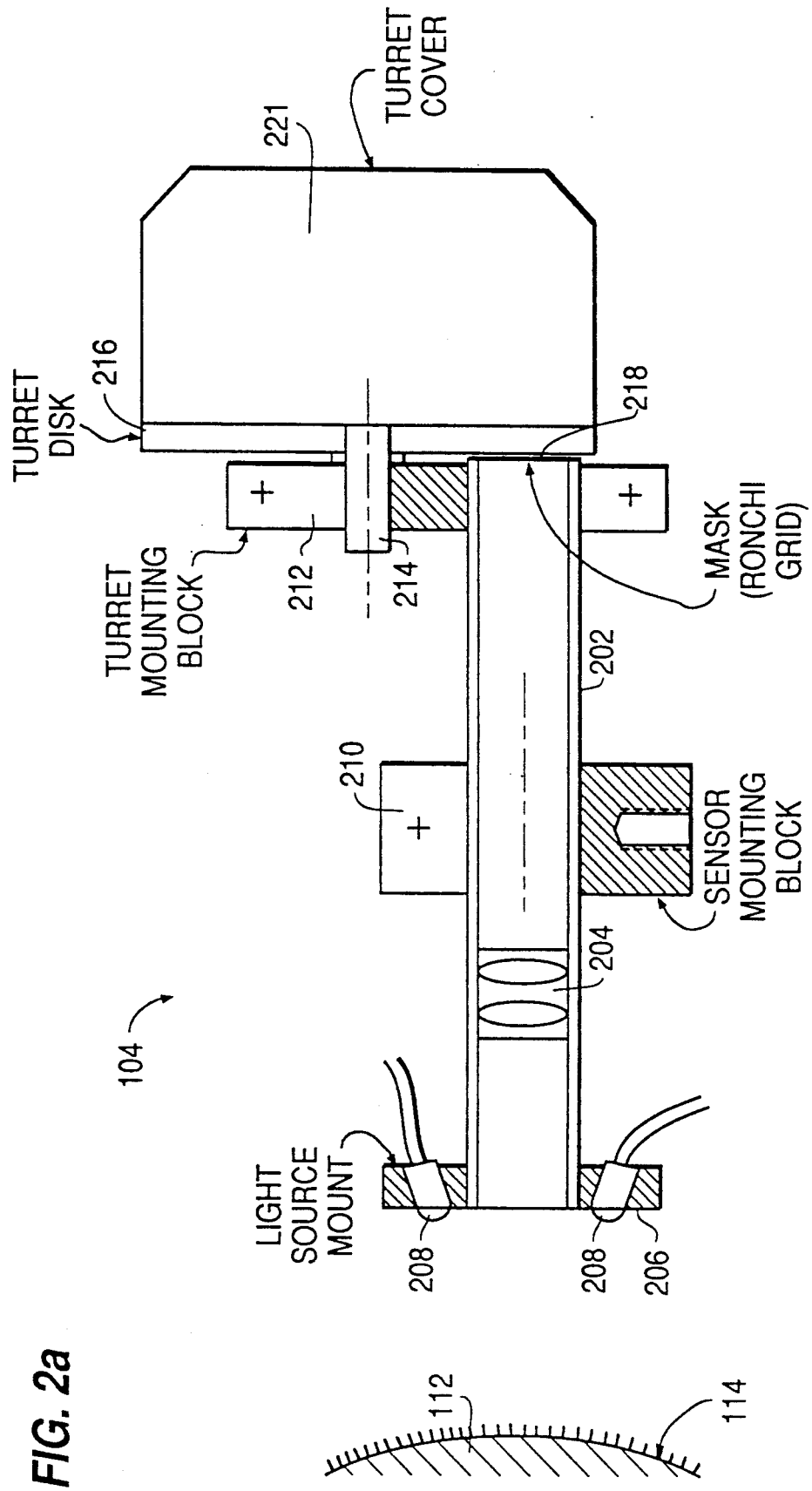
FIG. 2a is a sectional elevation of the sensor unit according to the present invention.

FIG. 2a shows the mechanical components of sensor unit 104. As shown in FIG. 2a, sensor unit 104 comprises tube 202, lenses 204, light source mount 206, IRLEDs 208, sensor mounting block 210, turret mounting block 212, turret pin 214, turret disk 216, Ronchi grid mask 218, and turret cover 221.

Tube 202 may be approximately 0.625 inches in inside diameter, and is open at one end proximate to shaft 112. Light source mount 206 is attached to tube 202 near the open end, and holds two IRLEDs 208 so that when activated their infrared radiation impinges on shaft 112 in the region of the open end of tube 202.

IRLEDs 208 are preferred as a radiation energy source because they have a good spectral match with photodetectors and have been found to be superior in mean time before failure (MTBF) and tolerance to shock loads in the present application. IRLEDs are also less expensive than any laser, and may actually provide higher resolution than a laser in the present incoherent detection application.

Lenses 204 are mounted in tube 202 and act to focus an actual size image of lines 114 onto Ronchi grid mask 218, which is located at the end of tube 202 distant from shaft 112. Tube 202 is fixed in position relative to shaft 112 by sensor mounting block 210. Sensor mounting block 210 may be a block of material drilled to receive tube 202 and cut along the plane passing through the central longitudinal axis of tube 202 to form two parts which may be selectively fastened together about tube 202 to clamp tube 202 in a fixed position. In other embodiments, sensor mounting block 210 may be formed as a piece of relatively flexible material with a circular hole and a single radial slot. In this embodiment, fasteners are provided for clamping the sensor mounting block 210 in the region of the radial slot to effectively reduce the diameter of the circular hole, effecting a clamping of the tube 202. The sensor mounting block 210 may also utilize a circumferential clamping mechanism if desired, such as those well known for use in clamping hoses and pipes.

Sensor mounting block 210 will also be provided with means for attaching it to a fixed structure in the area of shaft 112 so that tube 202 is held in a relatively fixed location with respect to shaft 112.

Turret mounting block 212 is attached to the outside of tube 202 at its end distant to shaft 112 and holds pin 214 in spaced relationship with tube 202 such that the central longitudinal axis of pin 214 is parallel to the central longitudinal axis of tube 202. Turret disk 216 is rotatably mounted on pin 214. Turret disk 216 is provided with a turret cover 221 for covering components attached to turret disk 216.

Figure 2B:
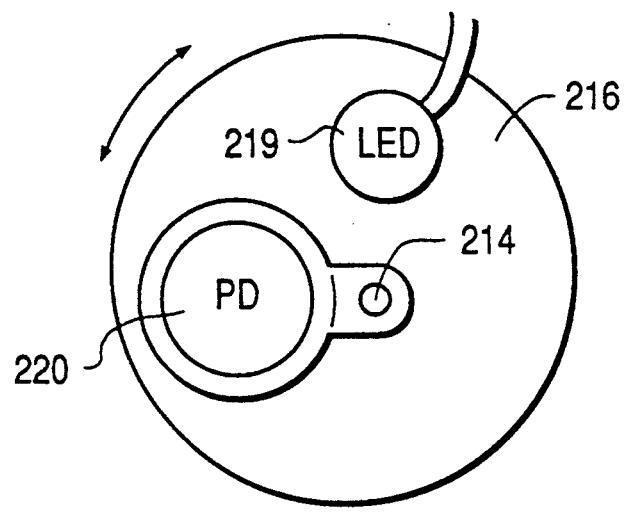
FIG. 2b is an end view, relative to FIG. 2a, of the turret disk shown therein.

Referring now to FIG. 2b, turret disk 216 is shown in more detail. Mounted on turret disk 216 are LED 219 and photodiode 220. LED 219 and photodiode 220 are mounted about the periphery of turret disk 216 such that either may be rotated into alignment with the end of tube 202. Preferably a locking mechanism or detent will be provided to selectively hold turret disk 216 in position so that LED 219 is aligned with tube 202, and alternatively to selectively hold turret disk 216 in position so that photodiode 220 is aligned with tube 202.

The novel turret mechanism provided in sensor unit 104 facilitates ready positioning and alignment of sensor unit 104 relative to shaft 112. For proper operation of sensor unit 104, it is necessary that the lines of Ronchi grid mask 218 be parallel to the imaged lines 114. It is also necessary that the image of lines 114 produced at Ronchi grid mask 218 through lenses 204 be an actual size image, corresponding precisely to the lines of the Ronchi grid mask 218. To perform the required alignment, a user can rotate turret disk 216 so that LED 219 is aligned with the end of tube 202. LED 219 is then activated, projecting an image of Ronchi grid mask 218 through lenses 204 and onto lines 114 on shaft 112. Sensor mounting block 210 is then loosened to permit rotation of tube 202 therein and also to permit linear movement of tube 202 along its central longitudinal axis relative to sensor mounting block 210. By linearly moving tube 202 and rotating this tube as necessary, parallel alignment of the Ronchi grid mask 218 and lines 114 can be obtained, and proper focusing of the image can be obtained, by examining the projected image of Ronchi grid mask 218 relative to lines 114. Then, sensor mounting block 210 is tightened to lock tube 202 in place, and turret disk 216 is rotated so that photodiode 220 is aligned with tube 202. As a result, sensor unit 104 is properly aligned, focused and positioned and is ready for sensing the passage of lines 114 on the surface of shaft 112. As a result of the turret disk and sensor mounting block design, sensor unit 104 is particularly easy to adjust in preparation for shaft monitoring operations.

Figure 2C:
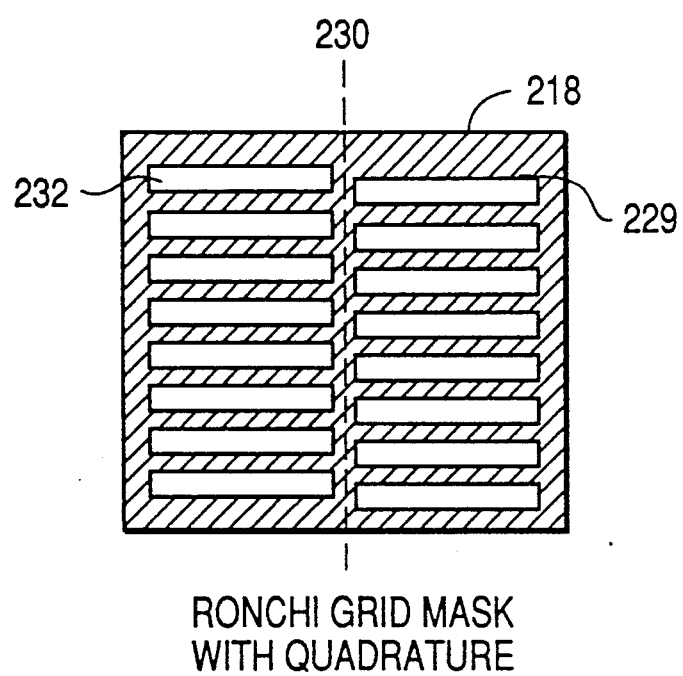
FIG. 2c is a view of the Ronchi grid mask which is configured to provide quadrature output according to the present invention.

If it is desired to determine the rotational direction of shaft 112 using the system according to the present invention, tube 202 will be made slightly larger and two photodiodes 220 will be provided, aligned so that one photodiode 220 senses the lines 114 through one side of Ronchi grid mask 218 and so that the other photodiode 220 senses the lines 114 through the other half of the Ronchi grid mask 218. Ronchi grid mask 218 will in this case be constructed according to the diagram of FIG. 2c, with lines 229 spaced according to the imaged spacing of lines 114. On one side of a central bisecting line 230, lines 232 lines will be offset from the lines 229 on the other side of the central bisecting line 230 by ¼ of the spacing distance of the lines 229, so that the two photodiodes 220 sensing the passage of lines 114 through the Ronchi grid mask 218 will produce output signals in phase quadrature with one another. The quadrature relationship of two such signals can be used to determine the direction of rotation of the shaft 112 according to the method which will be described in detail later.

Figure 3:
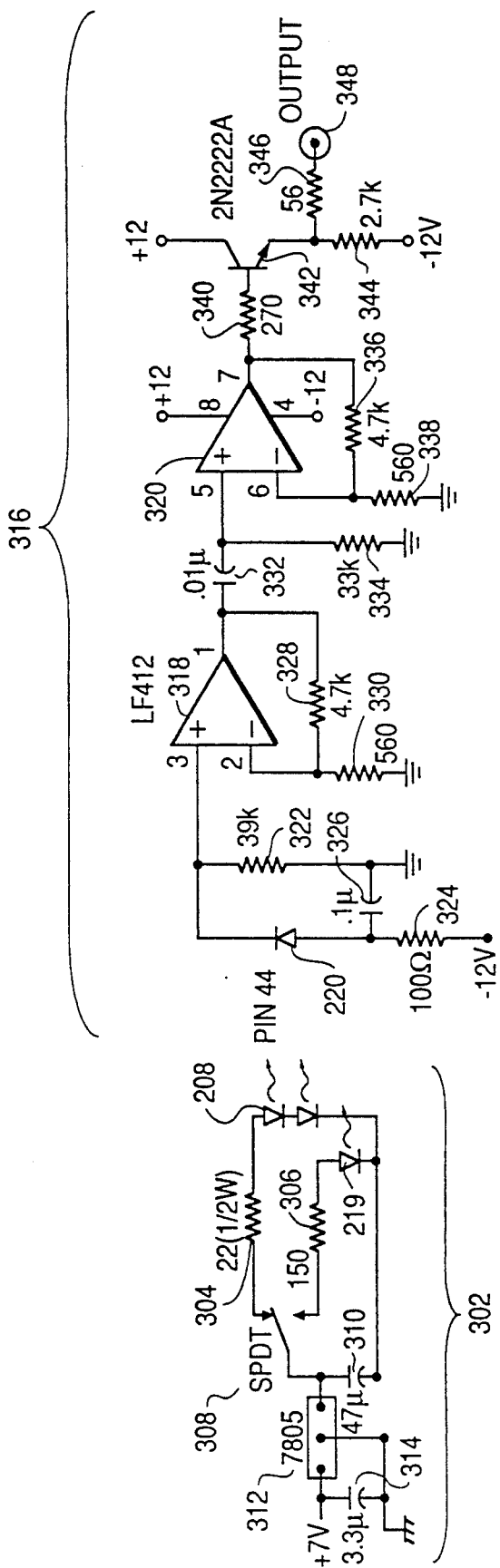

Referring now to FIG. 3, the electronic circuitry of sensor unit 104 is shown in schematic form. Power to LEDs 208 and 219 is provided by LED power circuit 302, which comprises LEDs 208 and 219, 22 ohm resistor 304, 150 ohm resistor 306, single-pole double-throw switch 308, 47 microfarad capacitor 310, 5 volt DC voltage regulator 312, and 3.3 microfarad capacitor 314. Voltage regulator 312, which may be a 7805-type integrated circuit voltage regulator, is connected between a 7 volt DC power source and ground. Capacitor 314 is connected between the 7 volt input to voltage regulator 312 and ground. Capacitor 310 is connected between the 5 volt regulated DC output of voltage regulator 312 and ground. The common terminal of switch 308 is connected to the 5 volt DC regulated output of voltage regulator 312, and one of the switching terminals of switch 308 is connected through resistor 304 to IRLEDs 208 in series, and then to ground. The other switching terminal of switch 308 is connected through resistor 306 and focusing LED 219 to ground. Thus, switch 308 operates to selectively actuate either IRLEDs 208 or focusing LED 219, providing the selected light emitting device with a constant regulated voltage supply to maintain a consistent illumination level. IRLEDs 208 may preferably be Honeywell Model No. SEP 8703-001 90 milliamp IRLEDs, while LED 219 is preferably a visible light range, super bright LED in accordance with its alignment and focusing use.

Sensor circuit 316, shown on the right hand side of FIG. 3, comprises photodiode 220 and a high pass filter circuit designed to pass frequencies greater than 482 Hz. Photodiode 220 may be a PIN photodiode such as a Model No. PIN 44 photodiode manufactured by United Detector Technology, Division of ILC Technology, 12525 Chadron Avenue, Hawthorne, Calif. 90250. The preferred photodiode 220 has a relatively large area such as 0.26 inches by 0.26 inches, and can therefore accommodate a Ronchi grid mask 218 with a relatively large number of lines, such as 32 lines. A larger area photodiode of this type produces better signal characteristics in the present application. PIN photodiodes are preferred for their relatively fast signal response.

The high pass filter of circuit 316 is preferably implemented using two operational amplifiers 318 and 320 which are preferably provided as a single integrated circuit such as Model No. LF 412 manufactured by National Semiconductor. The LF 412 integrated circuit is provided in a dual in-line pin package, the pin connections for which are shown in the drawing figure.

A power source of −12 volts DC is connected through 100 ohm resistor 324 to the anode of photodiode 220. The cathode of photodiode 220 is connected to the positive input of operational amplifier 318. The cathode of photodiode 220 is also connected through a 39K ohm resistor 322 to ground. The anode of photodiode 220 is connected through a 0.1 microfarad capacitor 326 to ground. The output of operational amplifier 318 is connected through a 4.7K ohm resistor 328 to the negative input of operational amplifier 318, which is also connected through 560 ohm resistor 330 to ground. The output of operational amplifier 318 is connected through a 0.01 microfarad capacitor 332 to the positive input of operational amplifier 320, which is connected through 33K ohm resistor 334 to ground. Operational amplifiers 318 and 320 are provided with +12 volt DC and −12 volt DC power inputs. In the case of the LF 412 integrated circuit, +12 volts DC is provided at pin 8 and −12 volt DC is provided at pin 4 to power both operational amplifier 318 and operational amplifier 320. The output of operational amplifier 320 (pin 7 of the LF 412) is connected through 4.7K ohm resistor 336 to the negative input of operational amplifier 320, which is also connected through 560 ohm resistor 338 to ground. The output of operational amplifier 320 is further connected through 270 ohm resistor 340 to the base of a transistor 342. Transistor 342 provides increased output driving capability for circuit 316. Transistor 342 may be a 2N2222A NPN transistor manufactured by SGS Thomson or others. The collector of transistor 342 is connected to a +12 volt DC source, and the emitter of transistor 342 is connected through 2.7K ohm resistor 344 to a −12 volt DC source, and also through 56 ohm resistor 346 to an output terminal.

When mounted in the apparatus shown in FIGS. 1 and 2 as described previously, the circuit of FIG. 3 produces an output at output terminal 348 in the form of a triangular wave peaking with the passage of each line 114 on shaft 112 past sensor unit 104. As the shaft 112 turns, the grid of lines 114 is displaced. Lines 114 are imaged in the plane of matching Ronchi grid 118, located in front of the photodiode 220. The signal from the photodiode 220 is a triangle wave with a fundamental frequency $$f_o = \frac{\pi D}{d} \Omega$$

where is in revs/sec and $f_o$ is in Hz (See FIG. 4b). The duplicate sensor unit 104 located a distance L along the shaft produces an output with the same frequency as the first sensor unit 104, but a different phase.

If shaft directional information is desired, the circuit shown in FIG. 3 will be duplicated so that two photodiodes 220 and associated circuits 316 are provided. The outputs 348 of these circuits will be substantially identical, but will have a 90 degree phase offset due to the quadrature relationship of the Ronchi grid lines in front of the two photodiodes 220. The sign of this phase difference (either leading or lagging) will indicate the direction of rotation of shaft 112.

Figure 4:
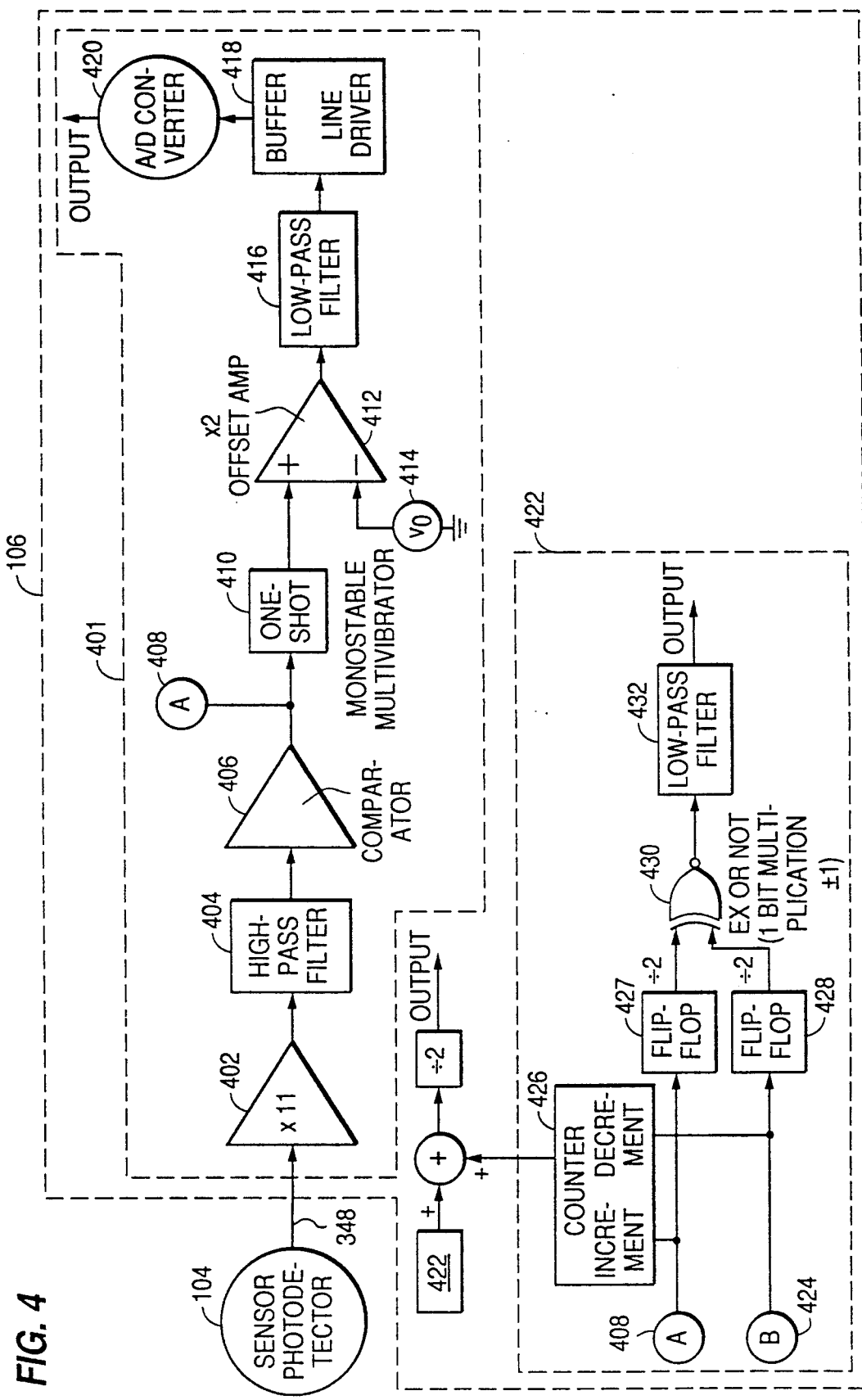
FIG. 4 is a block schematic diagram of the system of the present invention.

FIG. 4 shows the signal processing circuits 106 (first shown in FIG. 1) in greater detail. Referring now to FIG. 4, the output 348 of sensor unit 104 is connected to the input of a signal processing circuit 401. Signal processing circuit 401 comprises amplifier 402, high pass filter 404, comparator 406, terminal 408, monostable multivibrator 410, offset amplifier 412, reference voltage generator 414, low pass filter 416, buffer and line driver 418, and analog-to-digital converter 420. A single circuit 401 is shown in the drawing figure, but those skilled in the art will appreciate that it will be desirable to provide a circuit 401 for each sensor unit 104 of system 102.

Amplifier 402 provides an 11X amplification of the triangular wave output signal of sensor unit 104. Next, the signal is high-pass filtered by high pass filter 404 with $F_c = 1$ KHz. Preferably, high pass filter 404 is a fourth order Sallen and Key filter. The resulting signal is then passed through comparator 406 to produce a square-wave signal which rises and falls each time a line 114 passes by sensor unit 104. This output signal of comparator 406 is useful for controlling other parts of the circuit of the present invention as will be described in greater detail later. Therefore, terminal 408 is provided for connecting other parts of the circuit to receive this signal.

To produce a digital signal representing the speed of shaft 112, the signal of terminal 408 is connected to monostable multivibrator 410. The output of monostable multivibrator 410 is connected to the positive input of an offset amplifier 412 with a gain of 2. A reference voltage $V_O$ to the negative input of offset amplifier 412 by reference voltage generator 414. The output of offset amplifier 412 is provided to low pass filter 416, which is preferably an eighth order Bessel filter with $F_c$ variable from 2.25 to 10 KHz. The output of low pass filter 416 is provided to a buffer and line driver 418, buffer and line driver 418 converts the output signal of low pass filter 416 to a signal appropriate for input to analog-to-digital converter 420. The output of buffer and line driver 418 is a voltage proportional to shaft speed. Analog-to-digital converter 420 is connected to an input port of data processing and analysis circuits 108.

Circuit 422 shown in FIG. 4 further processes signals from sensor units 104 to provide information indication torsional deformation of the shaft being monitored. The inputs of circuits 422 are terminals 408 (corresponding to the output of comparator 406 of circuit 401) and terminal 424, which corresponds to the same output of comparator 406 of a circuit 401 connected to another sensor unit 104 at a different axial location from the sensor unit 104 providing the signal at terminal 408. The signals provided at terminals 408 and 424 are applied to the increment and decrement control terminals respectively of counter 426. As a result, counter 426 will provide a count output indicating the instantaneous torsional strain on the shaft. When there is no strain on the shaft, the same number of lines 114 will have passed by the sensor units 104 providing the signals to terminals 408 and 424 at any given time. The existence of torsional strain, or twist, in the shaft between the axially separated locations of the sensor units 104 providing the signals to terminals 408 and 424 will cause the passage of a greater number of lines 114 passed one of the sensor units 104. As a result, counter 426 will produce an output which is the integer function of the circumferential twist of the shaft, measured in units of the spacing between lines 114. Because the spacing of lines 114 and the diameter of the shaft are known, those skilled in the art will appreciate that this twist measurement can be converted to an angular measurement of shaft torsional strain.

In the preferred embodiment of the invention which uses four sensor units 104, the sensor unit located diametrically opposite to the unit providing the signal to terminal 408 and the sensor unit 104 diametrically opposite to the sensor unit 104 providing the signal to terminal 424 are connected to a duplicate circuit 422. The sensor units 104 connected to the duplicate circuit 422 are connected to the increment and decrement inputs of counter 426 of duplicate circuit 422 in the same manner as the other sensor units 104 located respectively at the same axial locations on shaft 112. Thus, in the absence of any non-rotational movement of shaft 112, the counters 426 of the two identical circuits 422 will produce the same output.

An important feature of the present invention lies in the ability to compensate for non-rotational movement of shaft 112. In the preferred embodiment, the outputs of counters 426, which are connected respectively to two sensor units 104 on a first side of the shaft and to two sensor units 104 on a second side of the shaft, are added together digitally and divided by two in the computer of data processing and analysis circuit 108. Because the sensors connected to the two counters 426 are diametrically opposed, other movements of the shaft (such as vertical movement) will increase the number of lines passing the sensors on one side of the shaft in a time period and decrease the number of lines passing the sensors on the other side of the shaft. By adding the line counts together, the effects of vertical motion are eliminated and an accurate count of the number of lines of torsional deformation is provided.

The circuit 422 also makes it possible to resolve the amount of torsional deformation more precisely than can be attained by merely counting lines. To accomplish this, the phase difference between the signals from sensor units 104 at axially spaced locations are measured. The phase difference indicates the fraction of the line spacing that must be added to the count of full line spacings to arrive at an accurate measurement of the circumferential torsional deformation of the shaft. To accomplish this, terminals 408 and 424 are connected respectively to flip-flops 427 and 428 which have the effective dividing the incoming pulse trains by two. This division guarantees top to bottom symmetry of the signals. A one-bit multiplication operation is then performed on the output signals of flip-flops 427 and 428 by exclusive NOR gate 430. The use of an exclusive NOR gate for the 1 bit multiplication operation provides less sensitivity to "pedestal" and an output duty cycle which spans 0 and 1.

The output of the X-NOR is low-pass filtered to remove energy at $2f_o$ (and higher frequencies). The output is linear for a phase shift of $<\frac{1}{2}$ cycle, but is multiple valued for larger angles. This is accomplished in the embodiment shown by transmitting the output of gate 430 through low pass filter 432 to produce a voltage proportional to the phase difference between the axially separated sensor unit 104 outputs. This voltage is provided, through an analog-to-digital converter (not shown), to the computer of data processing and analysis circuits 108 and is then added to the counter 426 output in the manner described previously in order to calculate the total lines and fraction of torsional deformation. If desired, this voltage output of low pass filter 432 may be added to the corresponding voltage output of the circuit 422 connected to sensor units 104 on the opposite side of shaft 112, and the resulting total may then be divided by two to produce an indication of phase difference which cancels the effects of non-rotational shaft motion as described previously with respect to the output of counters 426.

If absolute deflection measurements, or the sign of the oscillating deflection, are required, it is necessary to count half cycles rather than merely counting lines. The ambiguity in the sign of the phase shift at nT/2 can be resolved by a quadrature technique as described previously.

After compensation for pitch and plunge, remaining limitations to the resolution of the twist angle by the circuit of FIG. 4 are vibration of the optics in sensor unit 104, optical and electronic noise, variation in the line spacing of the lines 114 applied to the shaft 112, misalignment of the matching Ronchi grid 118 with the shaft lines 114, and accumulation of particles on the lines 114. In the underwater case, accumulation of particles may occur faster, and hydrodynamic loads on the optics housing can affect alignment and produce vibration of the housing. The limitations to frequency response are photodiode/electronics response, and grid passing frequency. A worst case for grid passing frequency, corresponding to a 4 ft. diameter propeller shaft at 50 RPM produces a grid passing frequency of 16 KHz. The fundamental of the phase-detector is twice this frequency. An adaptive low-pass filter set two octaves below the fundamental frequency limits the response to approximately 4 KHz for this case. Response for other cases is proportional to the surface velocity of the shaft.

After the phase data is converted to vibration amplitude and the signal is impedance matched, it can be transmitted to any remote on-board location by coaxial cable, shielded twisted pair, or optical fibers. A centrally located computer (e.g. in a ship's bridge, a control room, or a monitoring station) can sample the data and produce real-time output.

If unambiguous indication of the direction of shaft rotation is desired, and at least one sensor unit 104 has been provided with quadrature-related multiple sensors as described previously, the quadrature-related output signals of this unit will be fed to a phase detector circuit (not shown), which will produce as an output an indication of which of the two input signals leads the other by 90 degrees. This indication will be provided as an input to data processing and analysis circuit 108. Data processing and analysis circuit 108 can determine the rotational direction of shaft 112 based on this input.

As noted previously, alternate embodiments of the present invention may include a single sensor unit 104, with or without a quadrature sensor. If a single sensor unit 104 is provided, circuit 422 will not be provided. The available outputs of the system will be limited to rotation rate, direction, and variation in rotation rate. If these outputs are the only outputs desired, this embodiment will be desirable since it eliminates the need for additional sensor units 104 and portions of signal processing circuits 106.

Another alternate embodiment of the present invention provides two sensor units 104 which are axially separated along shaft 112. This embodiment permits measurement of torsional vibration, torsion, rotation rate, variation in rotation rate, shaft power, torque, and torque fluctuations. However, this embodiment lacks the capability of compensating for non-rotational pitch and plunge of the shaft. Therefore, this embodiment is appropriate for installations where pitch and plunge of the shaft are not expected to be a problem or where there are lower accuracy requirements for system outputs. In this embodiment, signal processing circuits 106 will be provided as shown in FIG. 4. However, the duplicate circuit 422 described with respect to the embodiment having four sensor units 104 may not be provided, and the output of counter 426 may not be added to another counter output and divided by 2 as described in the four sensor embodiment.

The computer of data processing and analysis circuit 108 (previously described with reference to FIG. 1) will receive and store the data inputs provided from signal processing circuits 106 and will perform the necessary analysis of this data to produce the desired output indicators specifying, for example, rotational direction, rotational speed, torsional vibration, torsion, and vertical pitch and plunge of the shaft. Preferably, the measured data will be stored in memory or mass storage of the computer so that readings over an expanded time period can be reviewed. In particular, it is preferable that the computer be programmed to identify the discontinuity in the received signals which inherently occurs at the "seam" in the lines applied to the shaft. Then, readings are stored in groups as a sequence of readings in a single revolution of the shaft. Readings from the same position on the shaft, taken in different revolutions of the shaft, may then be compared and analyzed using various techniques.

Any desired statistical or actual representation of the recorded quantities may be provided as outputs. For example, the outputs may be provided in instantaneous form, in phase-averaged form, in time-averaged form, as maximum or minimum measurements, as a range occurring in a given time period, or a measure of statistical deviation may be provided. Those skilled in the art will appreciate that once this data is in the computer, numerous conventional methods of analysis may be applied to the data and outputs may be provided depending on the desired purpose of the monitoring. For example, in an oceangoing ship, shaft direction and rotational speed may be provided as instantaneously changing outputs to a display on the ship's bridge. Statistical measures or visual representations of torsional vibrations may be provided on a screen in the engine room for review and monitoring by an engineer. The computer may also be programmed to trigger an alarm or other indication if sudden changes in readings occur or readings occur which are outside a predetermined range of acceptable values. Methods known in statistical process control can be used to identify significant deviations from normal conditions. For example, readings more than N standard deviations from the mean might trigger an alarm. Also, Shewhart-type or Cumulative Sum control charts and statistical methods for identifying problems using these charts could be used.

In one preferred method of analyzing torsional vibrations, phase averaging and known waveform eduction techniques may be applied to a series of data from the sensors. In one particularly preferred technique, plural sets of torsional strain readings taken in different revolutions are provided and readings from the sets which were taken from the same point on the shaft are added together. This additive process tends to emphasize recurring increases or decreases in torsional strain occurring at a particular point on the shaft. When the addition is completed for numerous points around the shaft, a model is developed of recurring variations in torsional vibration. A graph of these variations can then be produced and reviewed to identify possible problems with bearings, gears, or other power transmission elements connected with the shaft. Alternatively, the computer can be programmed to perform this analysis and to provide an output indication when any significant change in the pattern of torsional vibrations is detected.

As noted previously, very fine resolution of torsional strain measurements by the system of the present invention requires that the axially spaced sets of lines 114 be precisely matched so that the sets of lines are as nearly identical as possible. Therefore, the inventors have developed a novel method and apparatus for providing the required lines on a shaft. The process and apparatus disclosed is suitable for use with any shaft, but is particularly advantageous for retrofitting existing shafts mounted in industrial installations or ocean-going vessels with the required sets of finely spaced lines.

Figure 5:
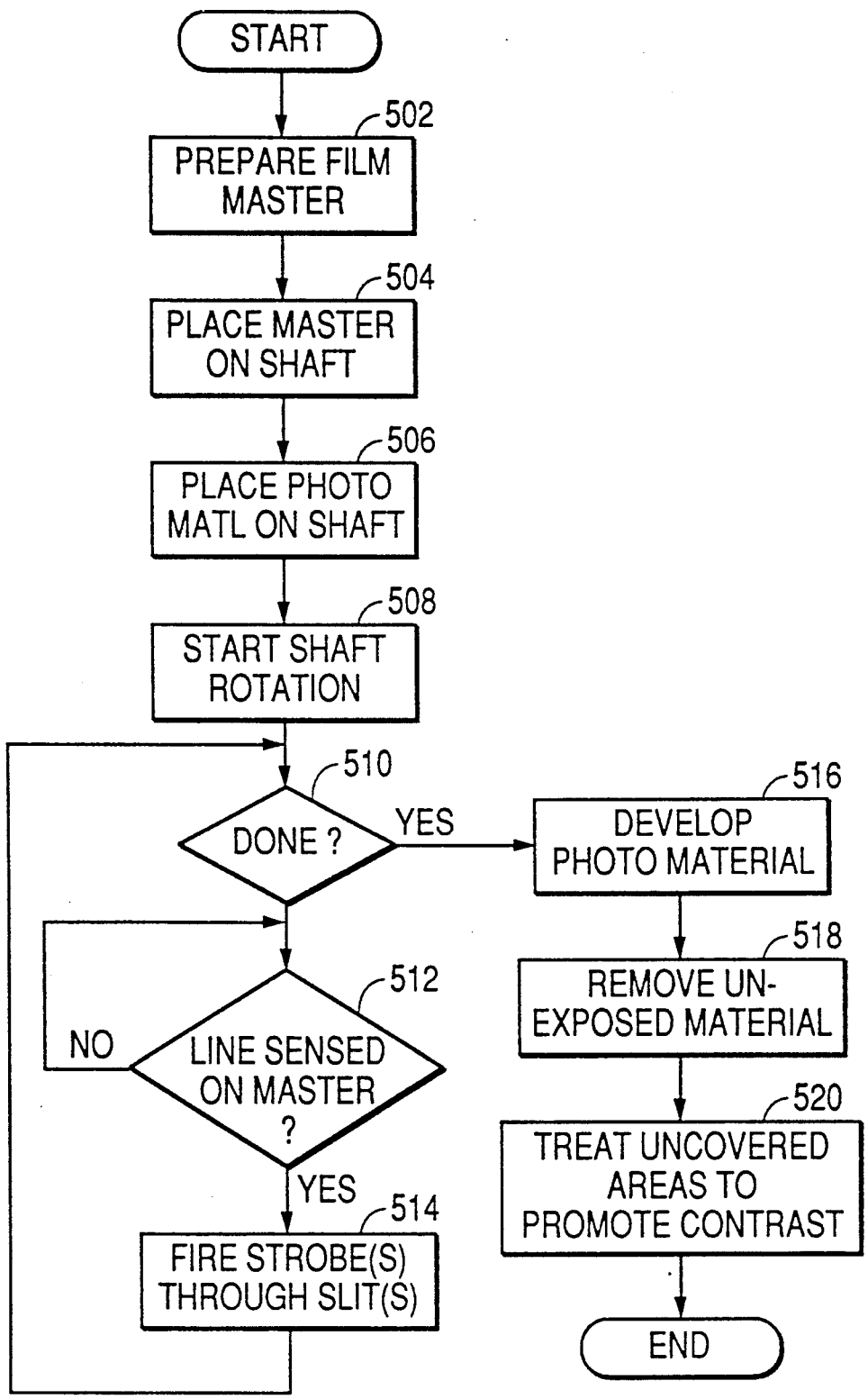
FIG. 5 is a flow chart showing the processing steps for the novel process according to the present invention for writing matched pairs of lines on a shaft.

A preferred process for photographically applying finely spaced grid lines to a shaft is disclosed in the flow chart of FIG. 5. In the preferred embodiment, a photosensitive emulsion is applied to the surface of the shaft to allow lines with a spacing of from 5 to 10 lines/mm to be photo-optically imprinted on the shaft. Lines will preferably be imprinted simultaneously at two axial locations.

The first step in the process, shown at block 502, is the preparation of a film master. The film master may be prepared using ordinary photographic film with high contrast, such as Kodak 5052 TMX film. Depending on the desired line spacing, different films may be used. The Kodak 5052 TMX film is suitable for line spacing on the order of 5 lines per millimeter. The grain and contrast of the film used should be finer for closer line spacing, and may be coarser for wider line spacing. Preferably, the film master is prepared by exposing lines onto the film, spaced at the desired distance, and along a length of film at least equal to the circumference of the shaft which is the object of the process. As will be described in more detail later, the film may be exposed by a synchronized strobe light shining through a thin slit onto the film as it is moved past the slit at a uniform speed. Then the film is developed to produce the film master which will control the application of lines onto the shaft.

In the next step of the process, the prepared film master prepared in block 502 is placed on the shaft as shown in block 504. The film master is fastened around the circumference of the shaft, in a position axially spaced from the locations where lines are to be formed on the surface of the shaft. A sensor unit 104 according to the present invention, and a least a portion of the signal processing circuits 106 as described previously, is placed proximate to the film master to detect the passage of the lines in the film master during rotation of the shaft.

Next, as shown in block 506, photosensitive material is placed on the shaft in the regions where lines are to be formed. In the preferred embodiment, the photosensitive material placed on the shaft in this step is a photopolymer, such as KTFR Resist, available as Catalog no. 1461946 from KTI Chemicals Incorporated, 2 Barnes Industrial Park Road, Wallingford, Conn. 06492. This material has a liquid form and can be applied around the circumference of the shaft in an even layer at the desired locations. The KTFR resist is heat treated after application to cure it onto the shaft. A selectively operable light source, such as a strobe light, is connected to the sensor unit 104 and signal processing circuit 106 and deployed in the area where the photosensitive material has been applied to the shaft. The shaft is shielded from the light source except in the area of thin slits corresponding to the desired line length and width and located at each point where lines are to be formed on the shaft.

In the next step of the process, shown in block 508, the shaft is rotated under power until the photosensitive material has been fully exposed. During rotation of the shaft, as shown in blocks 512 and 514, the sensor unit 104 is used to sense the presence of a line on the master film, and signal processing circuits 106 are used to trigger the light source, such as a strobe light, which exposes the photosensitive material on the shaft. Photopolymers such as KTFR are relatively insensitive to light so a considerable period of repeated exposure in each spot where a line is to be formed may be required. Because of the precision control of the application of light to the shaft in the process according to the present invention, it is possible to repeatedly apply light to the same desired line formation spots during each of numerous consecutive rotations of the shaft.

When exposure of the photosensitive material is complete, the photo material is developed as shown at block 516. For developing KTFR, KTFR developer is used (KTI Chemicals catalog no. 1017631). Next, in step 518, the unexposed photopolymer, which because of its lack of exposure has not been cured onto the shaft, may be removed leaving only the polymer at the desired line locations. The unexposed material may then be removed using a solvent made for this purpose.

Next, as shown in block 520, the areas of the shaft between the applied photopolymer lines are treated to promote contrast between the lines and the shaft. Such treatment may be accomplished in a number of ways. In one preferred method, KTI KTFR blue dye (KTI catalog no. 1473362) is applied around the circumference of the shaft in the region where the lines have been formed. The blue dye adheres to the polymer KTFR but does not adhere to the shaft. Thus, a contrast is produced which can be readily detected by sensor units 104. In another preferred method of treating the line areas to produce contrast, the exposed metal of the shaft may be etched, for example, with ferrite chloride, and the etched regions may be filled with a material of a color contrasting with the color of the shaft in the polymer coated region. For example, the etched regions may be filled with a black material. Then, a protective coating may be applied around the circumference of the shaft to preserve the applied lines.

In addition to these preferred methods, other methods may be used within the scope of the present invention. In some instances, when shafts are to be retrofitted with grid lines, it may be desirable to use a photochemical process rather than the photopolymer process described previously. For example, the room where the shaft is located could be darkened and unexposed film glued around the periphery of the shaft in place of the photopolymer in the previously described process of FIG. 5. Then, the film could be exposed according to the process of FIG. 5 and subsequently developed on the shaft. This process has the advantage of requiring only a single rotation of the shaft for exposure of the film. The disadvantage of this process compared to the most preferred embodiment described with respect to FIG. 5 is that the film attached to the shaft is more susceptible to damage than are lines produced by a staining or etching process.

Of course, rather than gluing a film carrier to the shaft, it would also be possible to apply the photosensitive chemicals used on such a film carrier directly to the shaft before exposing and developing them by the same process previously described.

Figure 6A:
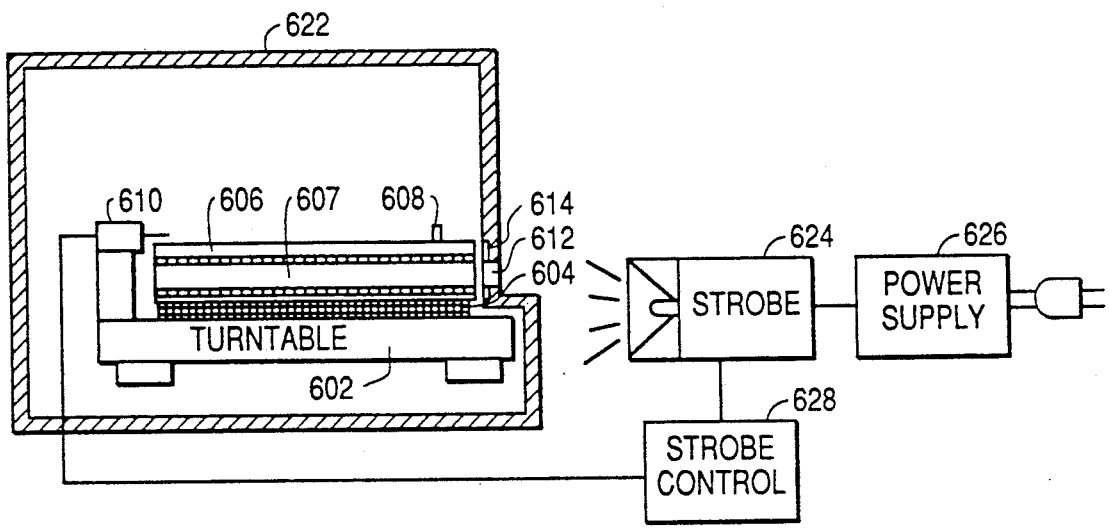
FIG. 6a is a diagram showing one apparatus useful in making a film master in the process of FIG. 5.
Figure 6B:
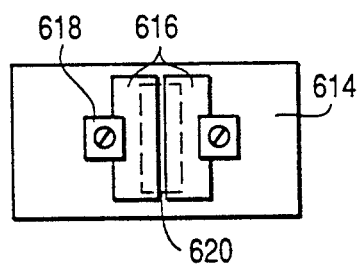

FIGS. 6a and 6b show an apparatus for preparing the film master according to step 502 of the flow chart of FIG. 5. As shown in FIG. 6a, the apparatus comprises turntable 602 having a platter 604, film carrier 606 mounted on turntable platter 604, film 607 mounted on film carrier 606, limit switch trip element 608, limit switch 610, and slit carrier 614, all surrounded by light blocking enclosure 622 except in the region of a hole 612 permitting the access of light to slit carrier 614. A strobe control circuit 628 is connected to turntable 602 and to limit switch 610 and is operatively connected to control strobe 624 which is powered by power supply 626. Turntable 602 is a means for moving film 607 past slit carrier 614 at a precisely uniform speed. For relatively small shafts, turntable 602 may be a direct drive audio turntable system such as a Technics model SL 1900 with its stylus and auxiliary lighting removed. Alternatively, a DC servomotor and appropriately sized rotating turntable could be used. Examples of appropriate servomotors are those made by Inland Motors, Parker Hannifin Corp., and others. Film carrier 606 may be formed from aluminum or other suitable material and must be uniformly circular to a high degree of precision. Film carrier 606 is mounted on platter 604 for rotation therewith. The limit switch trip element 608 is aligned in conjunction with limit switch 610 to activate the limit switch, thereby indicating that the film carrier has reached a desired position and that strobing should be initiated. Turntable 602 and its associated components are enclosed in light blocking enclosure 622 which shields film 607 from external light such as that produced by strobe 624, except in the region of slit carrier 614. Referring to FIG. 6b, slit carrier 614 is constructed as an opaque plate of material, for example aluminum, with a cutout in the region of slit 620. Two adjustable slit edges 616, which may, for example, be razor blades, are aligned under a microscope to produce the desired slit width. Slit edges 616 are then locked into position using clamps such as locking devices 618.

Referring again to FIG. 6a, in operation, slit 620 is aligned in front of film 607 and turntable 602 is actuated. When limit switch trip element 608 actuates limit switch 10, the resulting signal to strobe control circuit 628 actuates a precision timing circuit which cycles strobe 624 at precisely calculated intervals to expose film 607 through slit 620. Slit 620 is located very close to film 607, preferably within $\frac{1}{2}$ millimeter. Because film 607 rotates at a uniform speed, and strobe 624 is actuated at precise intervals, precisely spaced lines are exposed onto film 607. Preferably, strobe control circuit 628 also includes a counter which activates strobe 624 a specified number of times to produce a specified number of lines, and then ceases to activate strobe 624. In this way, overwriting of previously exposed areas of the film is prevented. Alternatively, the circuit could be designed to activate strobe 624 beginning with the activation of limit switch 610, and strobe control circuit 628 could cease activating strobe 624 when limit switch 610 is actuated a second time, indicating that film 607 has made a complete revolution. Although the second method would result in an area of double exposure, film 607 could be aligned so that this area would occur near an end of film 607 which could then be cut off on attachment of film 607 to the shaft.

Strobe 624 may be a GEN RAD model GR 1538-A Strobotac operating with an external trigger in the form of strobe control circuit 628. The required frequency of the strobe will be a function of the film carrier diameter, the rotational speed of the turntable, and the desired line spacing. As an example, for a cylinder diameter of 2.95 inches and a rotational speed of $33\frac{1}{3}$ RPM, the frequency of strobe 624 should be set to 656 Hz. for a line spacing of five lines per mm.

Figure 7:
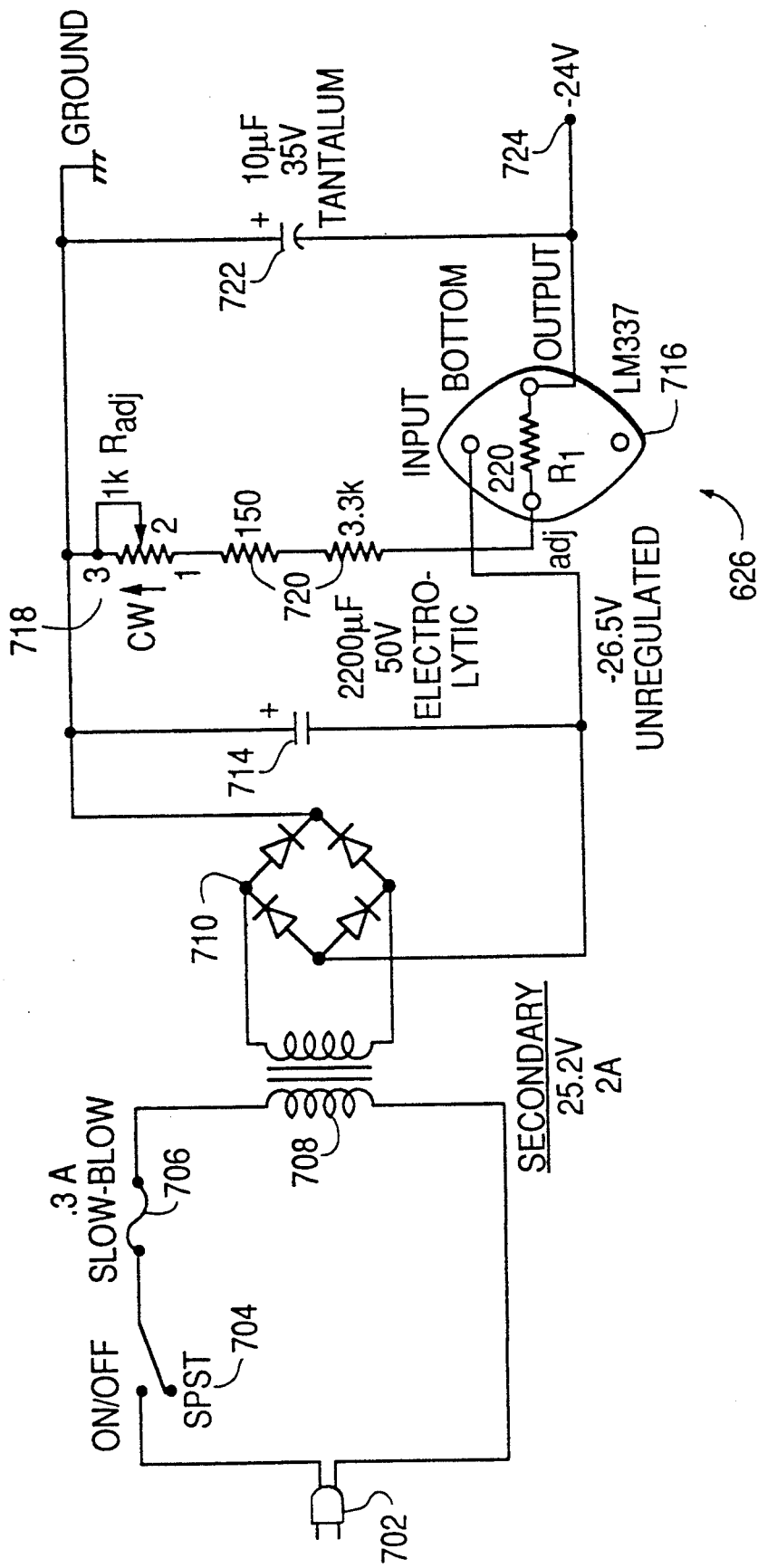

Because of the need for precision exposure of film 607, strobe 624 should be provided with a regulated power supply to eliminate variations in intensity caused by alternating current power. FIG. 7 shows a relatively simple 24 volt DC power source supply which can be used for this purpose. In the power supply, line cord 702 is connected to a source of 120 volt AC power, which upon closure of switch 704 completes a circuit passing through fuse 706 and the primary of transformer 708. the secondary of transformer 708 has a turns ratio which provides 25.2 volts AC at 2 amperes. The secondary of transformer 708 is connected to a full wave bridge rectifier 710. The output of full wave bridge rectifier 710 is connected across electrolytic capacitor 714 and then to voltage regulator 716 which may be an LM 337 voltage regulator. Resistors 718 and 720 are provided for adjusting the output voltage. On the other side of voltage regulators 716, at the output 724 of power supply 626, a tantalum capacitor 722 of 10 microfarads is connected between output terminal 724 and ground.

Figure 8:
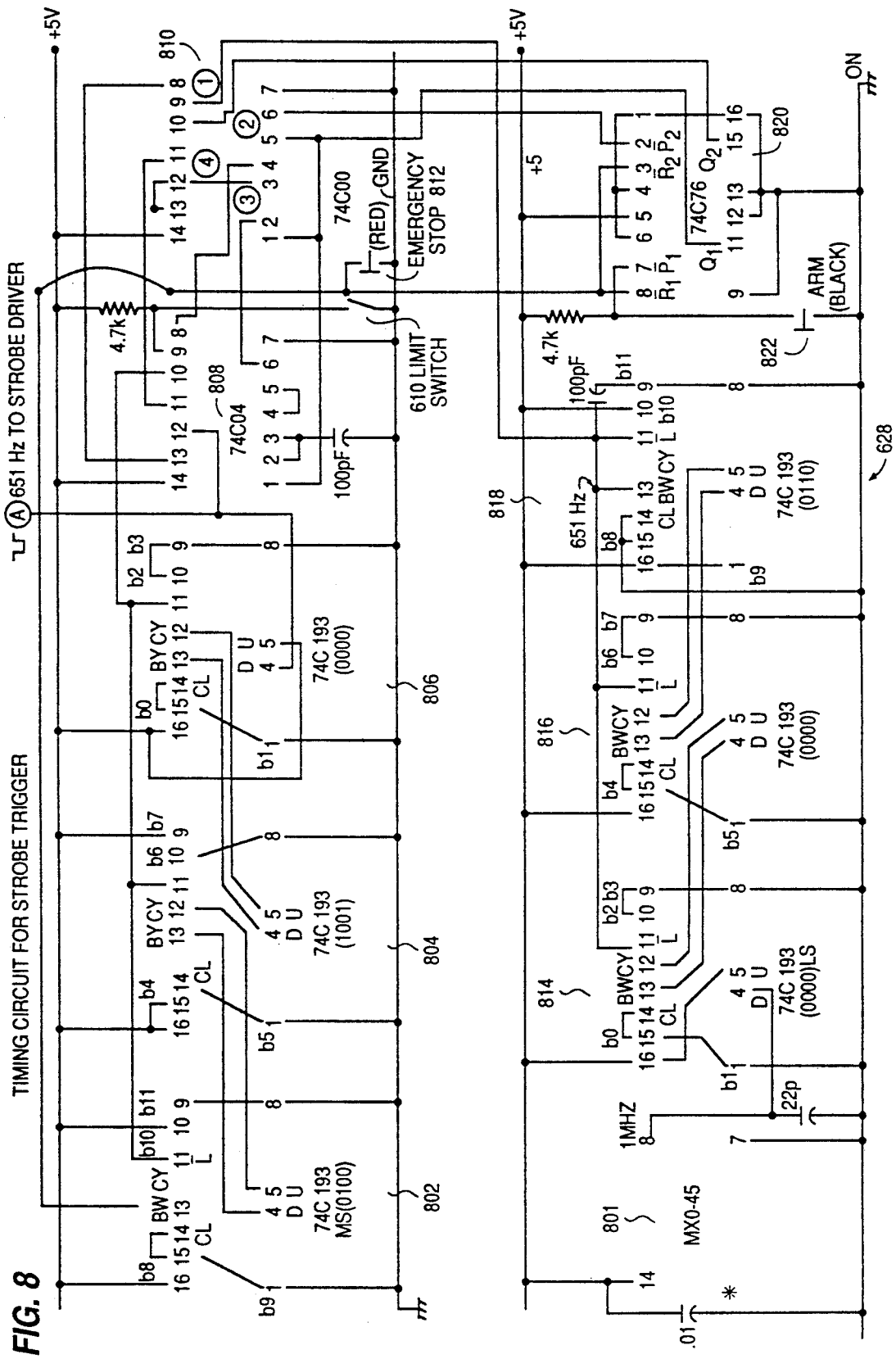

Referring now to FIG. 8, strobe control circuit 628 is shown in schematic form. Strobe control circuit 628 has as its major components a crystal oscillator 801 which may be an MXO-45 oscillator having a precise 1 MHz output. Strobe control circuit 628 is essentially a clock circuit which begins with a precision time base and divides the time base output using counters to produce a desired output pulse frequency. The output pulses are then used to trigger strobe 624. Strobe control circuit 628 also includes a counter for the output pulses and means attached to the counter for disabling the pulsed output after a predetermined number of pulses have been generated. Specifically, circuit elements 802, 804, 806, 808, 810, 814, 816, 818, and 820 are operative to start the flashing of the strobe at a precise 651.04 Hz rate upon actuation of limit switch 610 and to actuate the strobe for a predetermined number of flashes. As an example, for a film carrier diameter of 2.95 inches and spacing of five lines per millimeter, 1176 flashes might be performed, thus forming 1176 spaced lines on the film master. An emergency stop switch 812 and an arm switch 822 are provided for control of circuit operation.

Figure 9:
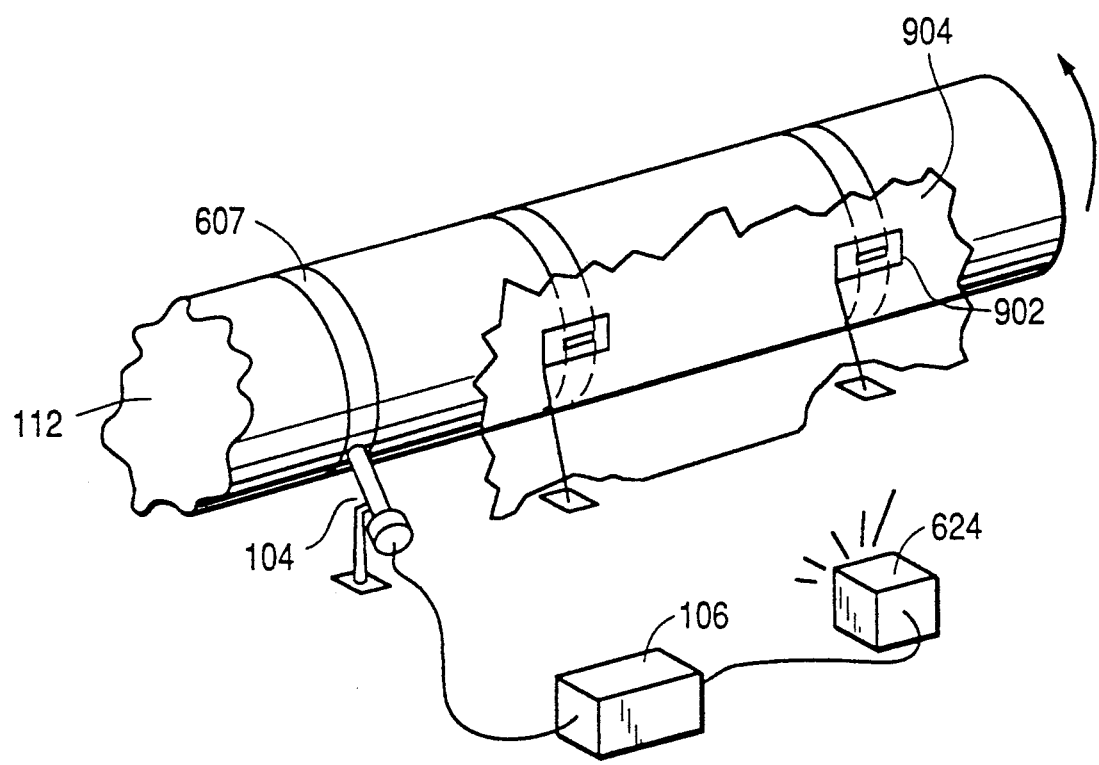
FIG. 9 is an oblique view showing the setup of apparatus for writing lines onto a shaft useful in the process of FIG. 5.

Referring now to FIG. 9, a typical apparatus setup is shown for application of lines to a shaft on-site, as described with respect to the flowchart of FIG. 5. Film master 607 is placed around the circumference of shaft 112 and sensor unit 104 is aligned to sense the passage of lines on film master 607. The output of sensor unit 104 is connected to a portion of the circuit of signal processing circuits 106. Referring briefly back to FIG. 4, the portion of the circuit 106 used is the portion comprising amplifier 402, high pass filter 404, and comparator 406 terminating at terminal 408. Terminal 408 provides a square wave pulse upon passage of each line on film master 607. Terminal 408 is connected to a power boost circuit (not shown) which provides current boosting and level and impedance matching depending on the requirements of the trigger terminal of the strobe selected. This power boost circuit is connected to the trigger terminal of strobe 624. Strobe 624 is located to provide light through slit masks 902 which are aligned very close to photosensitive material 903 which has been placed on shaft 112 in the locations where matched sets of grid lines are desired. Of course, a shield 904 prevents light from strobe 624 from reaching photosensitive material 903 except in the areas of the slits in slit masks 902. It will be understood that only part of shield 904 is shown to avoid obscuring the other parts of the apparatus.

Figure 10:
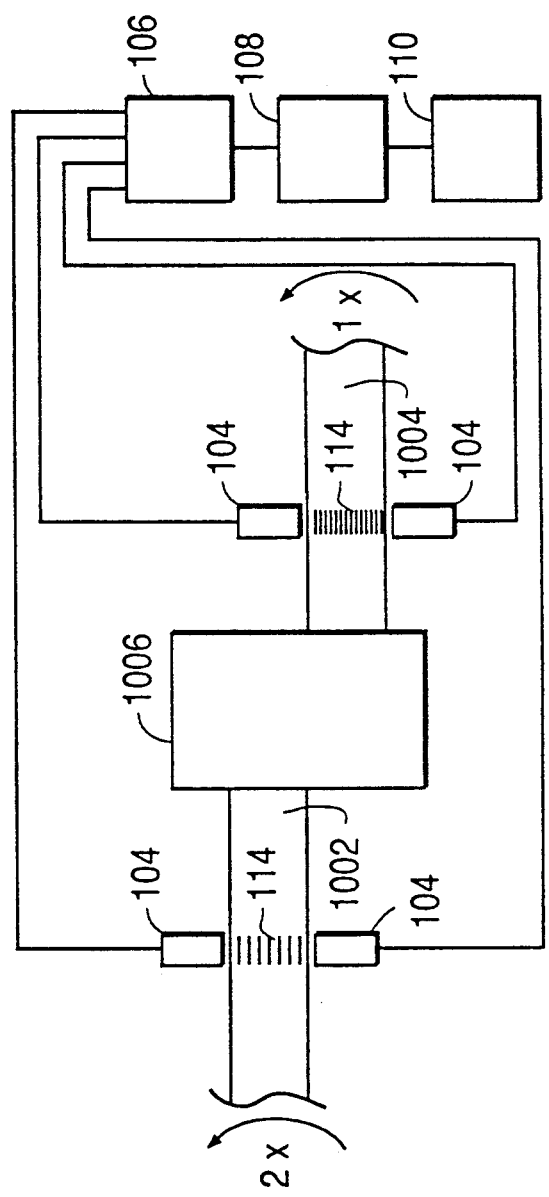
FIG. 10 is a block diagram showing the application of the system of the present invention to multiple-shaft systems.

In another embodiment of the present invention, as shown in FIG. 10, the system disclosed may be used with a plurality of different shafts 1002 and 1004, separated by one or more transmission elements such as gearbox 1006. In this embodiment of the invention, lines 114 are placed on the shafts 1002 and 1004 in the same manner as previously described for placing plural matched sets of lines on a single shaft. However, because of the action of gearbox 1006, shafts 1002 and 1004 do not rotate at the same speed. Preferably, shaft 1002 rotates at an integer multiple of the rotational speed of shaft 1004, for example at twice the speed of shaft 1004. During application of the lines, the film master should be placed on the fastest rotating shaft in the system, for example shaft 1002. Then, lines are formed synchronously on both shafts as the machine is operated, according to the process described herein. Synchronous formation of the lines will result in lines 114 on shaft 1002 with greater spacing than lines 114 on the slower rotating shaft 1004. When shaft 1002 rotates at twice the speed, the lines 114 will have twice the separation of the lines on shaft 1004. Therefore, for each rotation of the film master on shaft 1002, lines will be exposed on only half the circumference of shaft 1004.

The system shown in FIG. 10 shows as an example a system for sensing two shafts separated by a gearbox, but those skilled in the art will appreciate that this concept can be expanded to include sensors on any number of connected shafts in a power transmission system, which can be compared with the output of sensors on proximate shafts or with the output from sensors of any shaft in the system to perform desired operational analysis.

Because of the synchronous application of the lines 114 to the various shafts, the output of sensor units 104 associated with shaft 1002 and with shaft 1004 will have the same output frequency during operation of the power transmission system shown, and these outputs may be compared and analyzed using the same circuits and methods described previously to identify possible problems in gearbox 1006.

Thus, a monitoring system has been disclosed that provides a high angular resolution and high frequency response with low cost, no moving parts, no contact with the shaft, and no machining or other permanent changes to the shaft. The system can be easily and quickly retrofitted to existing shafts, and can be added and serviced while at sea. The system of the present invention is interchangeable, in that the same system is provided for all shafts. Only the photoetched lines on the shaft are not interchangeable. The system according to the preferred embodiment is very rugged, and can withstand large vibration and shock loads and resume functioning. Further, the system can be adapted to operate underwater in applications where such operation is desired.

We claim:

1. A system for analyzing rotational characteristics of a moving shaft having an axis of rotation and having a plurality of grid lines spaced about its circumference, comprising:

optical detection means mountable in a fixed position proximate tot he shaft in the area of the grid lines for producing an output signal varying with movement of the grid lines relative to said optical detection means during rotation of the shaft, said optical detection means comprising:

incoherent radiation energy generation means for producing incoherent radiation energy and directing it against the grid lines;

Ronchi grid means for selectively passing radiation from said radiation energy generating means and having a plurality of radiation passage lines with spacing corresponding to the grid lines;

lens means for imaging a radiation image scattered from the shaft grid lines onto the plan of said Ronchi rid means; and photodetection means for detecting the radiation level passing through said Ronchi grid means and generating an output signal representative of said movement of the grid lines; and processing circuit means connected to said photodetection means for receiving said output signal and generating an output signal and generating an output indicative of recurring torsional vibrations in the shaft.

2. The system of claim 1 wherein said incoherent radiation energy generation means comprises at least one infrared light emitting diode.

3. The system of claim 1 wherein said grid lines are parallel lines spaced from one another by less than one millimeter.

4. The system of claim 1 wherein a plurality of said optical detection means are connected to said processing circuit means.

5. The system of claim 4 wherein two said optical detection means are mounted in positions separated by a distance along said axis of rotation of the shaft.

6. The system of claim 5 wherein two said optical detection means are mounted on the same side of the shaft.

7. The system of claim 4 wherein four said optical detection means are mounted, two on each side of said shaft, at positions separated by a distance along said axis of rotation of the shaft.

8. The system of claim 7 wherein the optical detection means on one side of said shaft are mounted diametrically opposite to the optical detector means on the other side of said shaft, respectively.

9. The system of claim 8 wherein the four optical detection means are mounted substantially in the same plane.

10. The system of claim 8 wherein said processing circuit means further comprises movement compensation means for compensating for non-torsional motion of said shaft.

11. The system of claim 10 wherein said movement compensation means compensates for pitch and plunge of said shaft.

12. The system of claim 10 wherein said compensation means processes signals produced by a first of said optical detection means in conjunction with signals produced by a second of said optical detection means mounted in diametric opposition to the first.

13. The system of claim 12 wherein said compensation means additively processes the information contained in the signals of said first and second optical detection means to compensate for non-torsional motion of said shaft.

14. The system of claim 12 wherein said compensation means averages the signals of said first and second optical detection means.

15. The system of claim 5 wherein the processing circuit means subtracts a count of grid lines passing a first of said two optical detection means from a count of grid lines passing a second of said two optical detection means to determine an instantaneous relative torsional strain of the shaft between the location of said first optical detection means and the location of said second optical detection means.

16. The system of claim 5 wherein the processing circuit means calculates a phase difference between signals form a first of said two optical detection means and signals from a second of said two optical detection means to determine an instantaneous relative torsional strain of the shaft between the location of said first optical detection means and the location of said second optical detection means.

17. The system of claim 16 wherein the processing circuit means further maintains a count of grid lines passing said first optical detection means and subtracts from said count a count of grid lines passing said second optical detection means, combining said count and said calculated phase difference to precisely determine said instantaneous relative torsional strain of the shaft.

18. The system of claim 1 wherein said processing circuit means comprises memory for storing a time series of values representing said output signal of said photodetection means.

19. The system of claim 18 wherein said memory means stores data representing said time series of values for a plurality of rotations of said shaft, and said processing circuit means associates together data obtained at the same shaft position in different rotations.

20. The system of claim 19 wherein said processing circuit statistically analyzes said associated data to identify recurring torsional vibrations in said shaft.

21. The system of claim 1 wherein said Ronchi grid means has tow sets of radiation passage lines, a first set of parallel radiation passage lines and a second set of radiation passage lines parallel to the first set and offset therefrom.

22. The system of claim 21 wherein the second set of radiation passage lines is offset from the first by one fourth of the spacing between said radiation passage lines, thereby forming a quadrature grid mask.

23. The system of claim 21 wherein said photodetection means comprises at least two output signal producing means, one aligned with said first set of radiation passage lines and one aligned with said second set of radiation passage lines, whereby two output signals having a relative phase shift are generated in response to rotation of said shaft.

24. The system of claim 1, further comprising adjustment means for adjusting the image of said shaft grid lines onto the plane of said Ronchi grid means.

25. The system of claim 24 wherein said optical detection means comprises a cylindrical structure on which said lens means and said Ronchi grid means are mounted, and said adjustment means comprises clamping means for clamping and unclamping said cylindrical structure in a fixed position, such that when said clamping means is unclamped, said cylindrical structure may be rotated and translated with respect to said clamping means to achieve a desired orientation of the optical detection means with respect to said shaft.

26. The system of claim 24 further comprising projection means associated with said Ronchi grid means for projecting an image of said Ronchi grid means on said shaft, whereby the position of said optical detection means may be adjusted to achieve a desired relationship with said shaft.

27. The system of claim 26 wherein said projection means comprises: a radiation energy source; and transfer means for selectively aligning said photodetection means in an optical path of said Ronchi grid mask and said lens means, and for selectively aligning said radiation energy source in said optical path.

28. The system of claim 27 wherein said transfer means comprises a rotating turret which rotates to selectively align either said radiation energy source or said photodetection means in said optical path.

29. The system of claim 28 wherein said radiation energy source is a light emitting diode.

30. The system of claim 1 wherein said grid lies are applied to said shaft by a photo process.

31. The system of claim 30 wherein said grid lines are applied to said shaft by applying a photosensitive material to said shaft and selectively exposing said material to radiation energy to create said grid lines.

32. The system of claim 31 wherein said grid lines are spaced less than one millimeter apart.

33. The system of claim 5 wherein said grid lines are applied to said shaft at two axially spaced locations by a photo process.

34. The system of claim 33 wherein said grid lines are applied to said shaft by applying a photosensitive material to sad shaft at axially separated first and second locations and selectively exposing said material to radiation energy to create sad grid lines.

35. The system of claim 34 wherein said grid lines on the photosensitive material at the first location are aligned one-to-one with said grid lines at the second location.

36. The system of claim 35 wherein said grid lines are spaced less than one millimeter apart.

37. The system of claim 36 wherein said grid liens are spaced with at least five grid lines per millimeter of shaft surface.

* * * * *